1,806,702

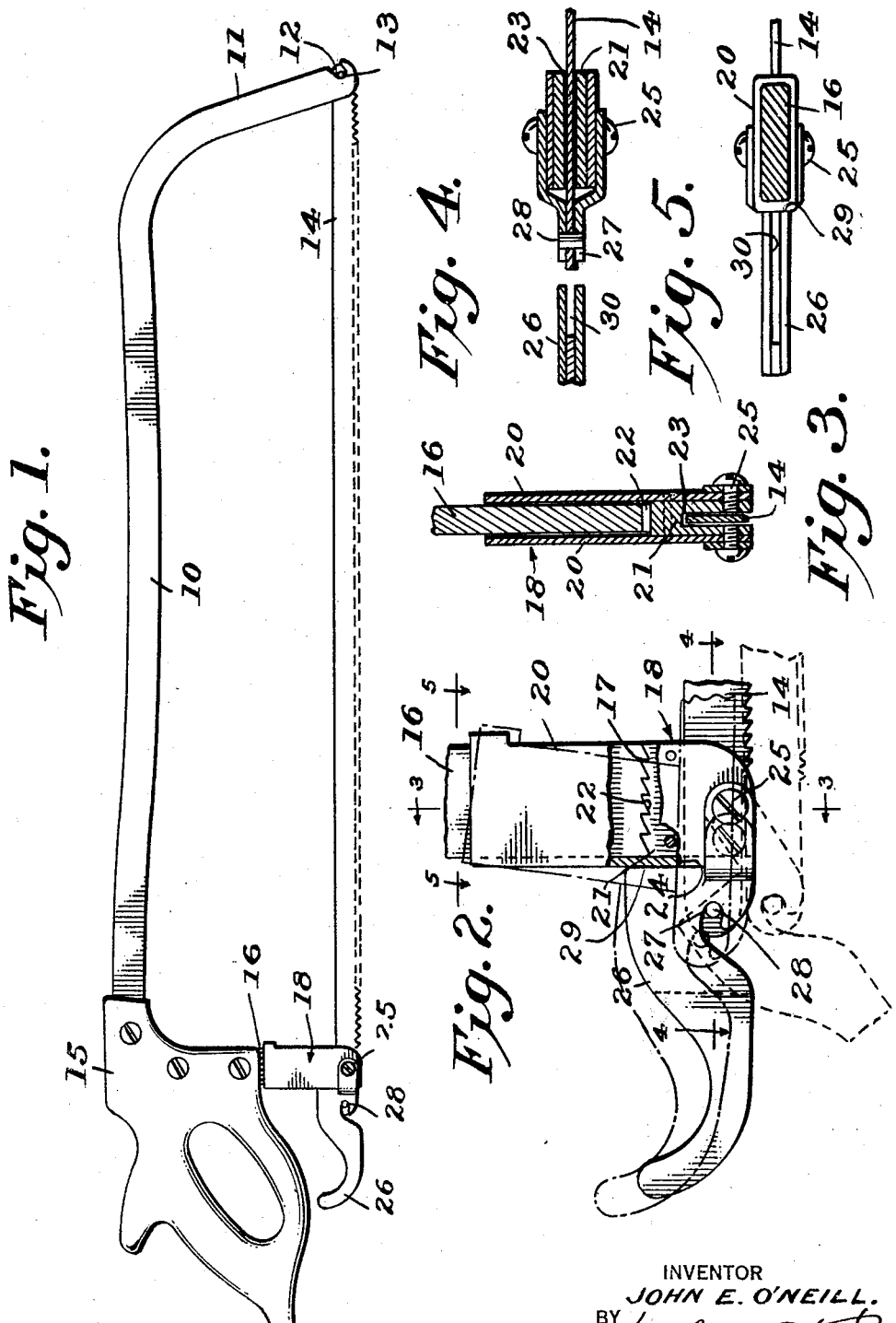
May 26, 1931. J. E. O'NEILL 1,806,702
SAW
Filed March 19, 1929
INVENTOR
JOHN E. O'NEILL.
ATTORNEY Patented May 26, 1931

UNITED STATES PATENT OFFICE

JOHN E. O'NEILL, OF CORNING, NEW YORK

SAW

Application filed March 19, 1929. Serial No. 348,171.

This invention relates to improvements in saws and more particularly to the means for securing saw blades in saw frames.

The object of the invention is to compensate for slight irregularities in the length of the blades and to keep them taut so as to prevent them from buckling while they are in use.

Another object is to securely lock a saw blade in its frame so as to prevent accidental disengagement of the parts.

The above and other objects may be attained by the use of my invention which embodies among its features a detachable socket arranged for adjustable engagement with one end of a saw frame, a lever pivoted to the socket and provided with a blade engaging element so positioned that when the lever is in blade-holding position the tension exerted by the blade will securely lock the lever in place.

In the drawings:

Fig. 1 is a side view of a saw equipped with my improved blade-securing lock;

Fig. 2 is an enlarged fragmentary view of the frame and blade showing the lock in detail, portions of the latter being broken away to more clearly illustrate the details of construction;

Fig. 3 is a vertical sectional view taken on the line 3—3 of Fig. 2;

Fig. 4 is a horizontal sectional view taken on the line 4—4 of Fig. 2; and

Fig. 5 is a horizontal sectional view taken on the line 5—5 of Fig. 2.

Referring to the drawings in detail, the saw frame 10 which may be of any preferred type is provided at its forward end with an outwardly extending arm 11 which is slotted to receive the forward end of a saw blade 14. The latter is provided with a transversely extending stud 13 for engagement in a notch 12 formed in the slotted end of the arm 11. A handle 15 is secured to the opposite end of the frame 10 and projecting outwardly from the frame in the same direction as the arm 11 is an arm 16 which is provided at its free end with a plurality of teeth 17 for cooperation with a blade-securing lock 18 to be more fully hereinafter described.

The lock 18 above referred to comprises a socket member 20 which is substantially U-shaped in cross-section and is provided adjacent one end with a block 21, the inner end of which is provided with teeth 22 for cooperation with the teeth 17 on the arm 16 in adjustably supporting the lock in position on the saw frame. As illustrated in Figs. 3 and 4, the block 21 is slotted at 23 to accommodate the saw blade 14 while the outer sides of the block are embraced by the lower ends of the socket member 20, it being understood that the back of the socket member is cut away at 24 to accommodate the saw blade. Pivoted at 25 to the socket member 20 is a lever 26 which is formed with a notch 27 for the reception of a stud 28 carried by the saw blade, it being understood that the lever is provided with a slot 30 for accommodating the end of the saw blade.

In using the device it will be seen that one end of the saw blade is fitted in the arm 11 of the saw frame 10 so that the stud 13 carried by the blade engages in the notch 12. Upon swinging the lever 26 on its pivot 25 into the position shown in dotted lines in Fig. 2, it will be evident that the stud 28 at the opposite end of the saw blade may be easily entered into the notch 27. After adjusting the saw blade in this manner with the socket in position on the arm 16 of the saw frame the lever 26 is thrown into the position shown in full lines in Fig. 2, thus moving the saw blade into proper position in the groove 23 of the block 21. When the end 29 of the lever moves into engagement with the back of the socket 20 it will be evident that the stud 28 will be moved into such a position that the greater the tension on the saw blade the more securely will the end 29 of the lever engage the socket 20. In this manner the blade is securely locked in the frame and yet may be easily and quickly detached, should it becomes necessary.

If, after use, the saw blade stretches or should a new blade be substituted which varies slightly in length with relation to the frame, it will be seen that by adjusting the socket relative to the arm 16 by changing the relative positions of the teeth 17 and 22, the differences in the length of the blade may be compensated for, it being understood that the fit of the socket 20 on the arm 16 is such as to permit it to swing back toward the saw handle when the lock is in released position, as illustrated in the dot and dash position shown in Fig. 2.

While in the foregoing I have shown and described the preferred embodiment of my invention it is to be understood that minor changes in the details of construction, combination and arrangement of parts may be resorted to without departing from the spirit and scope of my invention as claimed.

What I claim and desire to secure by Letters Patent is:

1. A saw frame having a pair of arms, a saw blade having one end removably secured to one of the arms, teeth on the end of the opposite arm, a handle on the toothed arm, a transversely U-shaped socket removably fitted on the toothed arm and adapted for swinging movement toward the handle, teeth on the socket for cooperation with those on the arm for holding the socket in adjusted position on the arm, and means carried by the socket for engagement with the opposite end of the saw blade and holding it in place in the frame.

2. The combination with a U-shaped frame, the end of one arm of which is slotted and notched to receive one end of a saw blade, and teeth on the end of the opposite arm, of a transversely U-shaped socket removably fitted on the toothed arm and adapted to swing away from the toothed arm, teeth on the socket cooperating with those on the arm in holding the socket in various positions away from the toothed arm, and a slotted and notched lever pivoted to the socket for receiving the opposite end of the saw blade.

3. The combination with a U-shaped frame, the end of one arm of which is slotted and notched to receive and retain one end of a saw blade, and teeth on the end of the opposite arm, of a transversely U-shaped socket removably fitted on the toothed arm, one end of said socket being movable in one direction away from said arm, a toothed block closing the movable end of the socket, the teeth on the arm cooperating with those on the block in holding the socket in various adjusted positions on and against movement relative to the arm, the block being provided with a groove for accommodating the saw blade, a lever pivoted to the socket, said lever being slotted and notched to accommodate and retain the saw blade, and a stop on the lever for engaging the socket to prevent movement of the lever in one direction beyond a predetermined position.

JOHN E. O'NEILL.